Oct. 12, 1926.

V. C. ROCHOLL 1,602,839

WHISTLE

Filed Jan. 21, 1924

INVENTOR.
V. C. Rocholl.
BY
ATTORNEY.

Patented Oct. 12, 1926.

1,602,839

UNITED STATES PATENT OFFICE.

VALENTINE C. ROCHOLL, OF FORT WAYNE, INDIANA.

WHISTLE.

Application filed January 21, 1924. Serial No. 687,431.

The invention relates to whistles and is particularly directed to whistles for use on locomotives, the invention being an improvement of the whistle described in my previous Patent No. 1,440,698.

It is well known that when the air is heavy and foggy a whistle on an approaching locomotive is not heard any distance in front of the vehicle. The sound waves generated by the whistle do not penetrate through the heavy atmosphere and the rapidly moving gases that pass out of the stack. Hence they fail to travel forwardly efficiently and often do not reach a person at a crossing, numerous crossing accidents being occasioned by such failures.

The object of my invention is to provide a whistle with a novel form of base by which the sound waves generated by the device are directed upwardly in order that they may pass through the heavier lower strata of air, and into a lighter strata above in which they may travel laterally in all directions so that the sounds may be heard ahead of the vehicle.

In the accompanying drawing I have illustrated the preferred embodiment of the invention in which—

Figure 1:
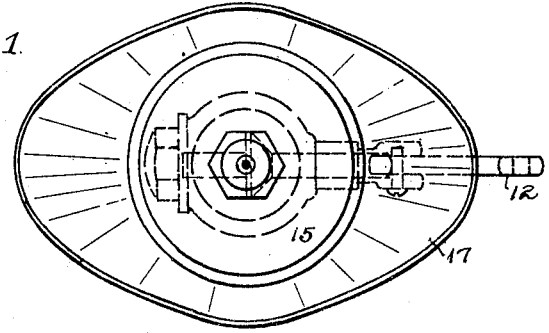
Figure 2:
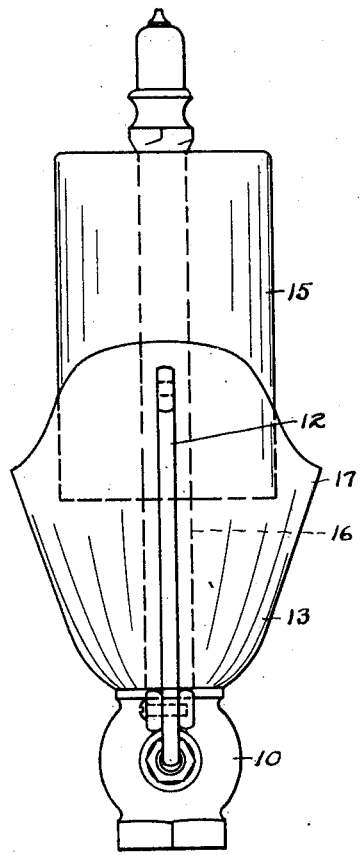
Figure 3:
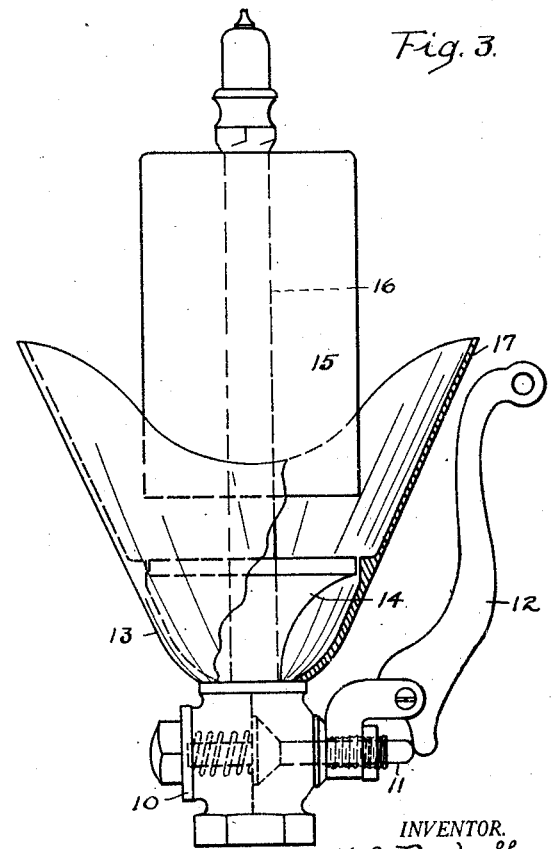

Figure 1 is a plan view of a whistle embodying the invention; Fig. 2 a rear elevational view of the same and Fig. 3 a side elevational view of the same partly in section.

In the drawings, 10 represents the base or valve housing, of selected type and 11 the valve that is operated by the lever 12 in the usual manner. A cup 13 is secured to the top of the housing and encircles the deflecting base 14 also secured to the housing, the upper peripheral edge of the base 14 being spaced from the cup to form an annular slot through which the steam or air under pressure is projected toward the lower edge of the bell 15 that is supported by the rod 16 on the base.

The cup 13 is extended upwardly and outwardly in the form of an ellipse in transverse cross section to form a sound wave directing member 17, the long diameter of the member being parallel to the direction in which the vehicle on which the whistle is installed is moved. The sides of the extension are of less height in their central portions and of less inclination outwardly than the ends thereof but the upper edges of said portions are above the lower edge of the bell and increase in height in opposite directions to their junction with the end portions.

The directing members 17 as thus formed causes the sound waves to travel upwardly much as the mouth of a wolf or dog directs sound waves upwardly when he howls. The waves are projected through the heavy or dense atmosphere into the lighter strata thereof and the sound is heard in all directions irrespective of the condition of the air or the speed of the vehicle.

What I claim is:—

A whistle comprising a valve casing and valve therein, a bell supported on the casing, means on the casing to direct fluid under pressure therefrom toward the lower end of the bell, and an elliptical member surrounding the lower end of the bell and spaced therefrom and adapted to direct sound waves upwardly, the wall of said member being flared outwardly in all directions, the outer end portions of said wall having a greater inclination than the side portions thereof and the opposite side portions being bifurcated.

In witness whereof I have hereunto subscribed my name this 15th day of January, 1924.

VALENTINE C. ROCHOLL.